United States Patent [19]

Simpson

[11] Patent Number: 4,681,369
[45] Date of Patent: Jul. 21, 1987

[54] RECLINABLE VEHICLE SEATS

[75] Inventor: Leslie J. Simpson, Amersham, England

[73] Assignee: Flight Equipment and Engineering Limited, Buckinghamshire, England

[21] Appl. No.: 807,475

[22] Filed: Dec. 10, 1985

[30] Foreign Application Priority Data

Dec. 19, 1984 [GB] United Kingdom ............... 8432094

[51] Int. Cl.⁴ .............................................. A47C 1/032
[52] U.S. Cl. .................................. 297/316; 297/324; 297/327; 297/337; 297/361
[58] Field of Search ............... 297/316, 324, 337, 340, 297/344, 355, 326, 327, 328

[56] References Cited

U.S. PATENT DOCUMENTS

| 302,672 | 7/1884 | Sargent | 297/324 |
| 3,640,570 | 2/1972 | Karlsen | 297/316 |
| 4,370,001 | 1/1983 | Ornberg | 297/361 X |
| 4,498,703 | 2/1985 | Schmidhuber et al. | 297/355 X |

FOREIGN PATENT DOCUMENTS 12912 of 1909 United Kingdom ............... 297/324

Primary Examiner—Kenneth J. Dorner
Assistant Examiner—Peter R. Brown
Attorney, Agent, or Firm—Watson, Cole, Grindle & Watson

[57] ABSTRACT

A reclinable seat for use in vehicles provides two systems enabling an occupant to adopt reclining postures. The seat comprises a bottom part and a back support part which are rotatable together about an axis in a support frame to be fixed in the vehicle. The axis is transverse to the seat and is adjacent to the bottom part, enabling the seat to be rotated bodily about the axis into reclining positions. The back support part is pivoted to the bottom part so that it can be tilted separately into reclining positions. Separate piston/cylinder control assemblies are provided for respectively locating the seat in positions angularly spaced about the axis and for locating the back support part in angularly spaced positions relative to the bottom part. A limiting mechanism is provided for limiting the permitted angle between the back support part and the bottom part, the limiting mechanism being influenced by rotation of the bottom part about the axis so as to reduce the permitted angle porgressively as the bottom part is rotated rearwardly from its normal substantially horizontal position.

6 Claims, 6 Drawing Figures

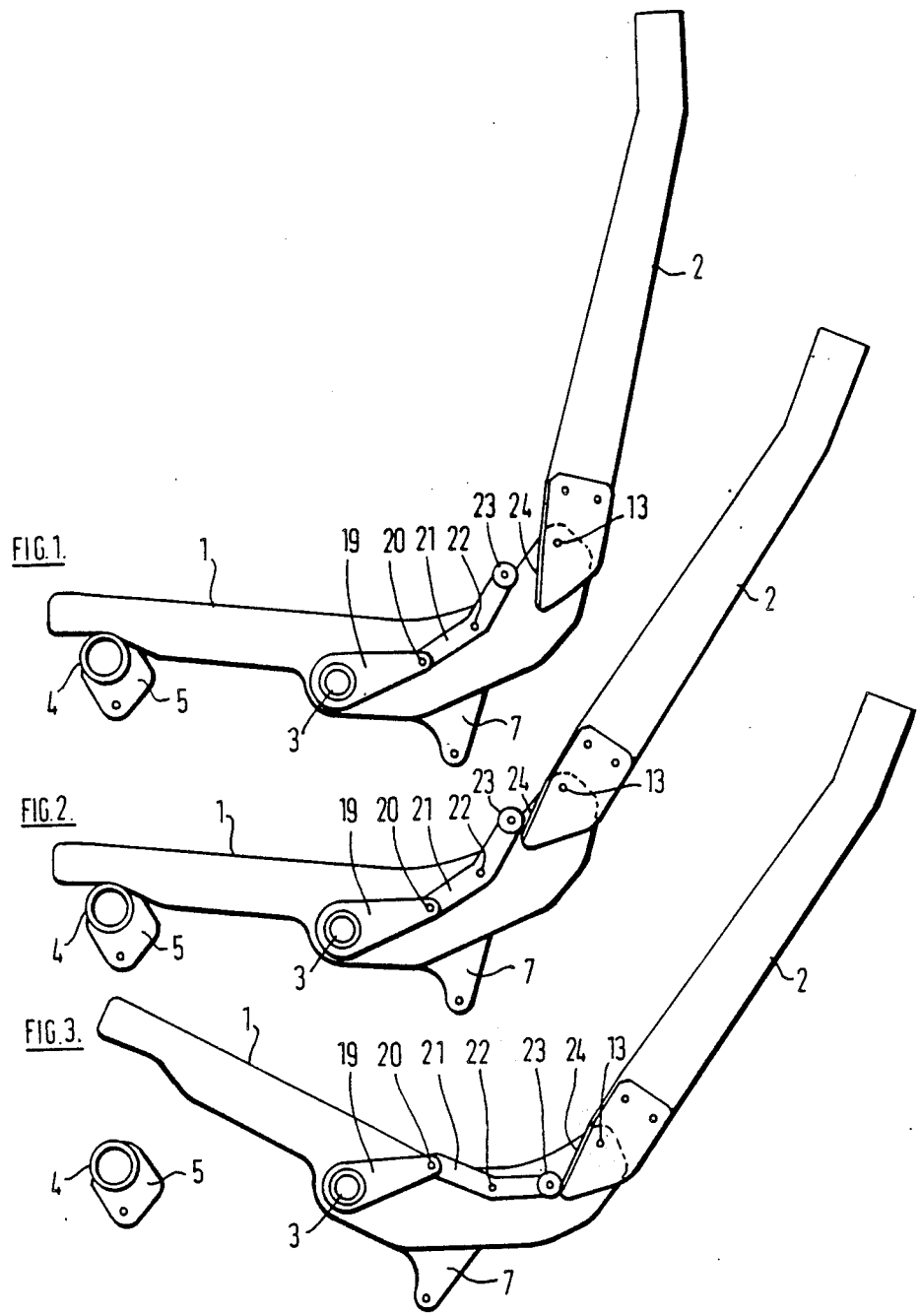

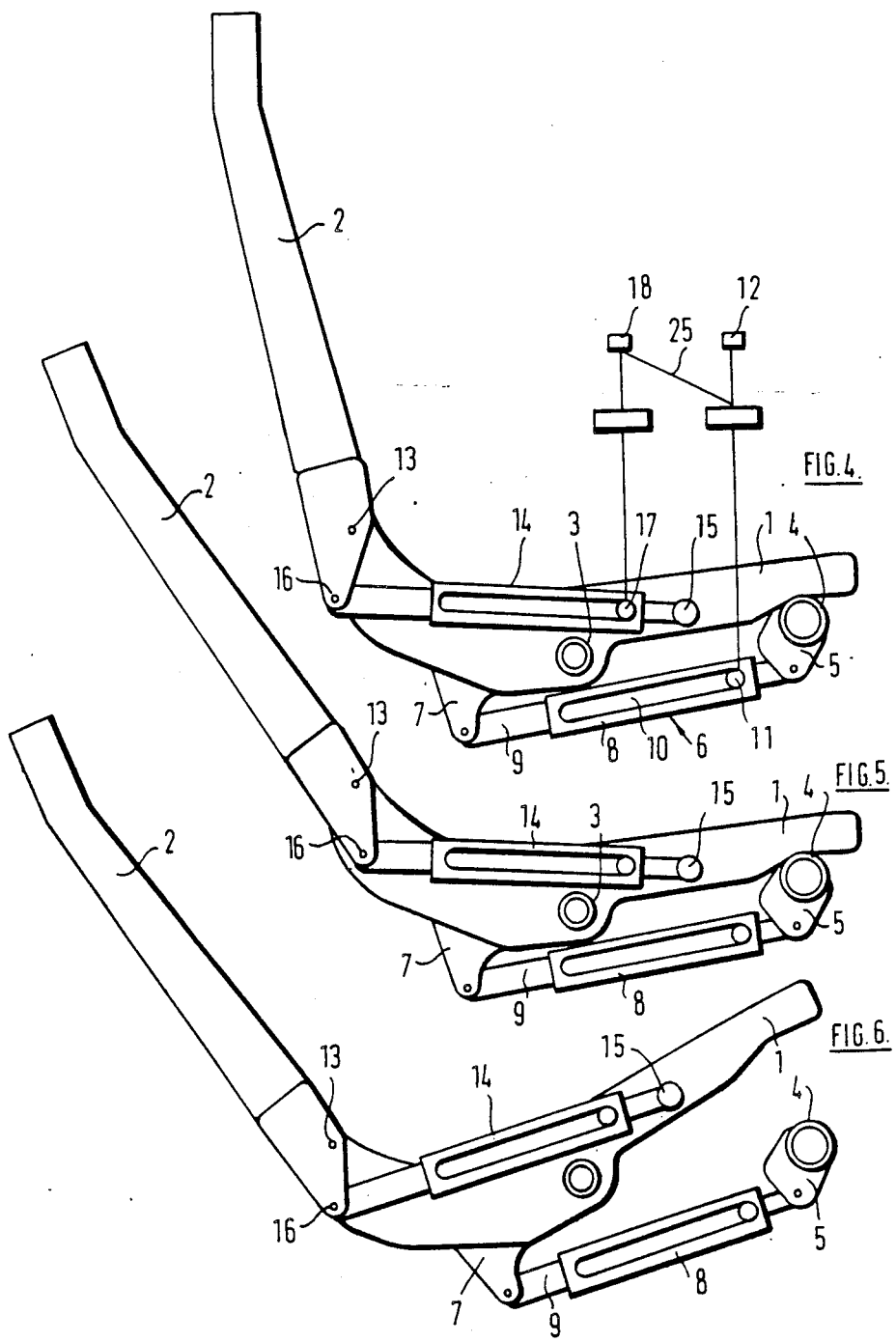

RECLINABLE VEHICLE SEATS

BACKGROUND OF THE INVENTION

1. Field of the Invention

This invention concerns a reclinable vehicle seat in which the bottom part and the back support part are rotatable together and the back support part is pivoted in relation to the bottom part. For convenience, such a seat with a pivoted back support part will be referred to as "of the kind described".

2. The Prior Art

A reclinable vehicle seat, of particular application in aircraft, comprising a bottom part and a back support which are rotatable together about an axis to be fixed in the vehicle transverse to the seat and adjacent to the bottom part as disclosed in U.S. Pat. No. 4,635,999. Means are provided for securing the parts in positions angularly spaced about the axis. The axis is preferably immediately below and towards the rear of the bottom part. The back support part may additionally be pivoted in relation to the bottom part, about the same or a different transverse axis, and means are provided for securing it in different positions relative to the bottom part. The seat preferably includes a leg support part extending downwardly from or adjacent to the front edge of the bottom part and optionally includes a foot rest. The leg support part may be fixed or pivoted to the bottom part so as to extend forwardly and downwardly when the seat is tilted rearwardly of its normal, upright position.

A seat of the kind described provides two separate systems whereby an occupant can adopt reclining postures. Either the seat can be rotated bodily about the noted axis or the back support part can be pivoted whilst the bottom part remains stationary. The two systems can be operated separately, enabling an occupant to select a wide variety of different dispositions of the bottom part and the back support part. An occupant can select dispositions which suit his or her personal physique and may alter the disposition as frequently as desired. This is a particular benefit on long journeys, avoiding fatigue and accommodating occupants comfortably for different activities.

It was stated in the noted U.S. patent that a seat of the kind described requires somewhat greater spacing between adjacent rows of seats than is required for seats in which the back support part is fixed in relation to the bottom part and can only rotate together with it, that is, through the same angles. This greater spacing was considered necessary because if the maximum reclining movement permitted by each system is limited, as is desirable, by the maximum rearward inclination of the back support part that will not inconvenience an occupant in the seat behind with a particular spacing of the rows of seats, then if the reclining movement permitted by both systems is used simultaneously the rearward inclination of the back support part could exceed that maximum and cause inconvenience unless the row spacing was increased.

It has now been appreciated that the need for that greater spacing can be avoided by a modification which limits the movements of the seat only to a minor extent.

SUMMARY OF THE INVENTION

The invention provides a reclinable vehicle seat of the kind described which includes means for limiting the permitted angle between the back support part and the bottom part, the limiting means being influenced by rotation of the bottom part about the axis so as to reduce the permitted angle progressively as the bottom part is tilted rearwardly from its normal, substantially horizontal upright position.

According to the invention a reclinable seat for use in a vehicle comprises a bottom part having front and rear edges, a back support part, and support means, a pivotal connection between the back support part and the bottom part adjacent to the rear edge thereof enabling the back support part to be tilted rearwardly from its normal position relative to the bottom part, the support means defining an axis for rotation of the bottom part, mounting means on the bottom part for mounting it on the support means so as to be rotatable about the axis between a normal, substantially horizontal position and reclining positions, first and second locating means for respectively defining a maximum reclining position of the bottom part and a maximum rearward tilted position of the back support part relative to the bottom part, first control means connected between the support means and the bottom part for locating the bottom part releasably in the maximum reclining position or any reclining position angularly spaced about the axis between the normal, generally horizontal position and the maximum reclining position, second control means connected between the bottom part and the back support part for locating the back support part releasably in relation to the bottom part in its normal position or in rearward tilted positions angularly spaced about the pivotal connection between the normal position and the maximum rearward tilted position, operating means accessible to an occupant of the seat for operation of the first and second control means, and limiting means arranged to limit the rearward tilting of the back support part when the bottom part is in a reclining position, the limiting means being influenced by the positioning of the bottom part about the axis so as to reduce the permitted rearward tilt of the back support part progressively with increasing recline of the bottom part.

Preferably, the limiting means includes a stop member connected to the bottom part for engaging a complementary part rigidly connected to the back support part. The connection between the stop member and the bottom part is such that when the bottom part is in its normal, generally horizontal position the stop member is clear of the complementary part, allowing the full permitted rearward tilting movement of the back support part relative to the bottom part. However, as the bottom part is rotated rearwardly about the axis, the connection causes the stop member to move to positions in which it will be engaged by the complementary part when the back support part is tilted rearwardly relative to the bottom part and will thus limit the angle of such tilting, the limitation being progressively increased with increasing recline of the bottom part.

BRIEF DESCRIPTION OF THE DRAWINGS

An embodiment of the invention is illustrated by way of example by the accompanying drawings in which:

FIGS. 1 to 3 are side elevations showing parts of a vehicle seat in three positions, and FIGS. 4 to 6 are complementary side elevations viewed from the opposite side.

DETAILED DESCRIPTION OF THE PREFERRED EMBODIMENT

Certain components are omitted from the drawings for the purpose of clarity.

Referring first to FIGS. 1 and 4, which show the seat in its normal upright position, the seat comprises a bottom part 1 and a back support part 2, which are connected together for bodily rotation about a fixed transverse axis located below and towards the rear of the bottom part 1 and defined by a beam 3 (which is a part of a support frame to be secured to the body of a vehicle, for example an aircraft). In this normal, upright position of the seat, the front of the bottom part is supported on a second beam 4, which is parallel to the beam 3 and is also a part of the support frame. When the seat is rotated rearwardly about the axis defined by the beam 3, the front of the bottom part rises clear of the beam 4 as shown in FIGS. 3 and 6.

For controlling this rearward rotation of the seat, a lug 5 is secured to the beam 4 and is connected by a spring-operated hydraulic piston and cylinder assembly 6 to a lug 7 secured to and extending downwardly from the bottom part 1 to the rear of the beam 3. The assembly 6, which can be considered to be a first locating means for the seat, is of the well-known kind and internal details are not shown. It comprises a double-ended cylinder 8 pivotally connected to the lug 5, within which is an axially slidable piston connected to a rod 9 which is pivotally connected to the lug 7. A spring within the cylinder 8 urges the piston towards the left in FIG. 4 and so urges the seat towards its normal upright position. The ends of the cylinder 8 are connected together by a tube 10 in which is a valve 11 which can be operated by a first operating means in the form of a button 12. The valve 11 can be considered to be a first control means for the seat. The button 12 is conveniently positioned for use by an occupant of the seat, for example in an arm rest (not shown). When the valve 11 is closed the piston is held in any position in the cylinder. When the valve is open, the piston can be moved in the cylinder, either to the right by an occupant rotating the seat rearwardly or to the left under the influence of the spring, perhaps assisted by an occupant, to rotate the seat back to its normal, upright position. The permitted travel of the piston within the cylinder limits the angle through which the seat can be rotated. It is limited by abutments in the assembly, set according to the intended spacing of seats in a vehcle, so that when the seat is rotated to the maximum permitted angle, as shown in FIGS. 3 and 6, the back support part will not unduly inconvenience an occupant of a seat immediately behind.

The back support part 2 is pivotally connected to the bottom part 1 by pins 13 so that it can be tilted rearwardly with respect to the bottom part. For controlling this tilting a piston and cylinder assembly 14 similar to the assembly 6 is connected between a pin 15 on the right hand side of the bottom part 1 and a pin 16 in the bottom end of the back support part 2, below the pivot pin 13. The piston and cylinder assembly 14 can be considered to be a second locating means for the seat. The piston of the assembly 14 is urged to the left in FIGS. 4 to 6 by the spring contained within the cylinder so as to urge the back support part 1 towards its normal position with respect to the bottom part 2, but it can be moved to the right by tilting the back support part 2 rearwardly with respect to the bottom part 1 towards a maximum reclined position in which it is inclined at about 120° to the bottom part, as shown in FIGS. 2 and 5. Movement of the piston is permitted by opening a valve 17 which is controlled by a second operating means in the form of a button 18 located adjacent to the button 12. The valve 17 can be considered to be a second control means for the seat. The travel of the piston is limited by abutments in the assembly which are set to locate the normal position of the back support part 2, more or less at right angles to the bottom part 1, and its maximum tilted position.

This maximum tilted position of the back support part 2 relative to the bottom part 1 is determined in relation to the spacing between rows of seats in the vehicle and limited by the design of the assembly 14. The maximum permitted angle between the parts 1 and 2 is such that, when the bottom part 1 is in its normal, upright position, the back support part 2 when so reclined to the maximum extent will not unduly inconvenience an occupant of a seat immediately behind.

The assembly as described thus provides two separate systems whereby an occupant can adopt reclining postures within the maximum movements permitted by the assemblies 6 and 14. However, it will be understood that if the bottom part 1 and the back support part 2 were rotated rearwardly together about the axis defined by the transverse beam 3 from the position shown in FIGS. 2 and 5 with the back support part tilted rearwardly to its maximum extent, the back support part 2 would swing further downwardly and rearwardly and be liable to inconvenience or strike a passenger in a seat immediately behind. The same would occur if the back support part 2 was tilted rearwardly from the position shown in FIGS. 3 and 6. To avoid this a stop mechanism is mounted on the left side of the seat as shown in FIGS. 1 to 3.

A lug 19 is secured to the beam 3 and extends rearwardly from the beam. The end of the lug 19 is pivotally connected by a pin 20 to one end of a bell-crank lever 21 which is pivotally mounted on a pin 22 extending laterally from the left side of the bottom part 1 approximately in the region of the junction between projections of the major seating surfaces of the parts 1 and 2. The other end of the bell-crank lever 21 extends upwardly and rearwardly from the pivot pin 22 and carries a stop roller 23. A complementary cam 24 is rigidly connected to the bottom end of the back support part 2, extending beyond the pivot pin 13 in line with the stop roller 23. The elements 19–24 can be considered to be a limiting means for the seat.

When the seat is in its normal, upright position as shown in FIGS. 1 and 4, the stop roller 23 is held clear of the cam 24 and permits the back support part 2 to be reclined relative to the bottom part 1 to the maximum extent permitted by the design of the assembly 14, as shown in FIGS. 2 and 5. In that position, the stop roller 23 is just clear of the cam 24 as shown in FIG. 2. If the bottom part is rotated rearwardly from that position, the resulting movement of the pivot pin 22 relative to the pin 20 will cause the stop roller 23 to engage the ride down the cam 24, tilting the back support part 2 progressively forwardly about the pivot pins 13 relative to the bottom part 1 so as to reduce the angle between the parts and thus prevent the back support part 2 from being rotated rearwardly with the bottom part 1. FIGS. 3 and 6 show the bottom part 1 rotated rearwardly to the maximum extent permitted by the assembly 6 and it can be seen that the inclination of the back support part 2 is substantially the same as in FIGS. 2 and 5 and it has moved rearwardly only to a slight extent due to the movement of the pivot pins 13.

The tilting movement of the back support part 2 in relation to the bottom part 1 and the bodily rotation of the bottom part 1 and the back support part 2 about the transverse beam 3 can be effected independently by an occupant of the seat operating the respective buttons 18 and 12 and applying or removing bodily pressure to or from the appropriate parts of the seat. However, in order to enable the stop roller 23 to operate as described, an interlink 25 is provided between the buttons 12 and 18 which control the valves 11 and 17 of the assemblies 6 and 14. Without such an interlink, an occupant leaning backwardly in the seat in an attempt to recline the bottom part 1 from the position shown in FIGS. 2 and 5 would have to open the valves of both assemblies to allow the back support part 2 to be tilted forwardly relative to the bottom part by the stop roller 23 riding down the cam 24, or he might apply undue force and break the seat. To avoid this, the interlink 25 enables the button 18 to open both valves 11 and 17 but does not affect the button 12 which opens only the valve 11. Whenever rearward rotation of the bottom part 1 or tilting of the back support part 2 would be liable to incline the back support part 2 to a greater extent than is shown in FIGS. 2 and 5, the stop roller 23 will engage the cam 24 to limit the angle between the back support and bottom parts, the permitted angle being progressively limited as the rearward rotation of the bottom part 1 about the axis defined by the beam 13 is increased.

Instead of the hydraulic piston and cylinder assemblies 6 and 14, similar pneumatic or gas-controlled assemblies could be used, or other kinds of means could be used to locate the respective parts releasably in their various positions. Instead of employing abutments in the assemblies for limiting the angle through which the bottom part 1 can be rotated about the axis defined by the beam 3 and the angle through which the back support part 2 can be tilted relative to the bottom part 1, separate locating means could be used for defining the maximum reclining position of the bottom part 1 and the normal and maximum rearward tilted positions of the back support part 2 relative to the bottom part 1. For example, a stop member could be mounted on the support frame to be engaged by the bottom part 1 when it reaches its maximum reclining position and stop members could be mounted on the bottom part 1 to be engaged by the back support part 2 in its normal and maximum tilted positions relative to the bottom part 1.

Seats embodying the invention provide a greater variety of seating postures for occupants, and thus greater comfort, than reclinable seats in which the bottom part and the back support part are rigidly connected together. This is done without unduly inconveniencing the occupants of seats in adjacent rows, even when the row spacing is no greater than is necessary for such rigidly connected seats, for example 813 mm (32 ins.). The occupant of a seat can adopt various reclining postures permitted by the two systems whilst an occupant of a seat behind is confortably accommodated with that seat in the normal, upright position. By using seats embodying the invention, vehicle operators are able to provide increased comfort for passengers without reducing the number of passengers that can be carried in a vehicle.

Seats embodying the invention may, and preferably do, include a leg support part as described in U.S. Pat. No. 4,635,999.

I claim:

1. A reclinable seat for use in a vehicle comprising
   a bottom part having front and rear edges,
   a support means, said support means defining an axis of rotation for said bottom part,
   a back support part,
   means providing a pivotal connection between the back support part and the bottom part adjacent to the rear edge thereof enabling the back support part to be tilted rearwardly from its normal position relative to the bottom part,
   mounting means on the bottom part for mounting said bottom part on said support means so as to be rotatable about said axis between a normal, substantially horizontal position and reclining positions wherein it slopes downwardly from its front edge towards its rear edge,
   first locating means connected between the bottom part and the support means for determining the degree to which said bottom part is rotated about said support means and for defining a maximum reclining position of said bottom part,
   second locating means connected between the back support part and the bottom part for determining the degree to which said back support part is pivoted about said pivotal connection and for defining a maximum rearward tilted position of the back support part relative to the bottom part,
   first control means for controlling the operation of said first locating means,
   second control means for controlling the operation of said second locating means,
   operating means accessible to an occupant of the seat for operating said first and second control means, and
   limiting means for limiting the rearward tilting of the back support part when the bottom part is in a reclining position, the limiting means being influenced by the positioning of the bottom part about said axis so as to reduce the permitted maximum rearward tilt of the back support part relative to the bottom part progressively with increasing recline of the bottom part.

2. A reclinable seat as claimed in claim 1, wherein said support means is a frame to be secured to a vehicle floor and includes a support to engage the bottom part adjacent to the front edge thereof for locating and supporting the bottom part when in its normal, substantially horizontal position.

3. A reclinable seat as claimed in claim 1, wherein said first and second locating means each comprise a fluid-controlled piston and double-ended cylinder means defining a fluid passage between the ends of said cylinder, and wherein said first and second control means comprises valves respectively associated with said fluid-controlled piston and double-ended cylinder means, and wherein said operating means comprises first and second operating elements for respectively opening said valves.

4. A reclinable seat as claimed in claim 3, including an interlink between said first and second operating elements whereby said second operating element can open both said valves.

5. A reclinable seat as claimed in claim 3, wherein said first and second locating means are included respectively in the first and second control means.

6. A reclinable seat as claimed in claim 1, wherein said limiting means includes a stop member connected to the bottom part and a complementary part rigidly connected to the back support part, link means connecting said stop member to the bottom part being arranged so that said stop member clears said complementary part when the bottom part is in its normal, substantially horizontal position but so that rearward rotation of the bottom part from said normal, substantially horizontal position moves said stop member to positions in which it will be engaged by said complementary part when the back support part is tilted rearwardly relative to the bottom part and thereby limit the angle of such tilting, the limitation being progressively increased with increasing rotation of the bottom part towards its maximum reclining position.

* * * * *